US005118076A

United States Patent [19]

Homes

[11] Patent Number: 5,118,076

[45] Date of Patent: Jun. 2, 1992

[54] CONTROL VALVE

[75] Inventor: Graham D. Homes, London, England

[73] Assignee: Lucas Industries Public Limited Company, Birmingham, England

[21] Appl. No.: 521,124

[22] Filed: May 9, 1990

Related U.S. Application Data

[62] Division of Ser. No. 282,051, Dec. 9, 1988, Pat. No. 4,957,275.

[30] Foreign Application Priority Data

Dec. 12, 1987 [GB] United Kingdom ................ 8729087

[51] Int. Cl.[5] .............................................. F16K 31/06

[52] U.S. Cl. .......................... 251/129.02; 251/129.19; 251/50

[58] Field of Search ...................... 251/129.02, 129.19, 251/50, 51

[56] References Cited

U.S. PATENT DOCUMENTS

| | | | |
|---|---|---|---|
| 4,646,976 | 3/1987 | Rembold et al. | 251/129.02 X |
| 4,690,374 | 9/1987 | Polach et al. | 251/129.02 |
| 4,717,118 | 1/1988 | Potter | 251/129.19 X |

*Primary Examiner*—Arnold Rosenthal

*Attorney, Agent, or Firm*—Dvorak and Traub

[57] ABSTRACT

An electromagnetically operable fluid control valve includes a valve member slidable in a bore in a valve body. Resilient means biases the valve member to the open position and an actuator including an armature when energized moves the valve member to the closed position. Stop means formed by a part movable with the armature engages the valve body to limit the movement of the armature and valve member when the actuator is de-energized. Damping means formed by a liquid filled recess in the part acts to damp the aforesaid movement.

3 Claims, 3 Drawing Sheets

CONTROL VALVE

This application is a continuation of application Ser. No. 282,051, filed Dec. 9, 1988, now U.S. Pat. No. 4,957,275, dated Sep. 18, 1990.

This invention relates to an electromagnetically operable spill control valve for use in a high pressure fuel injection pump which is intended to supply fuel to an internal combustion engine.

A known form of such a valve comprises a valve member slidable in a bore, a seating defined in the bore, the valve member being shaped for co-operation with the seating with the valve member and the bore defining an inlet chamber and an outlet chamber on opposite sides of the seating. The inlet chamber in use is connected to the pumping chamber of the injection pump and the outlet chamber to a drain. The valve member is coupled directly or indirectly to the armature of an electromagnetic actuator which is energised to draw the valve member into contact with the seating thereby during the displacement of fuel from the pumping chamber, causing the fuel to be delivered through an outlet leading from the pumping chamber to an injection nozzle. When during the displacement of fuel from the pumping chamber the actuator is de-energised, the valve member moves away from the seating under the action of a spring to allow fuel at high pressure to escape from the pumping chamber thereby terminating the delivery of fuel through the injection nozzle. The extent of movement of the valve member away from the seating is limited by a stop.

It is found that when the stop is engaged, there is a tendency for bounce to take place with the result that the valve member moves towards the seating and will tend to restrict the flow of fuel through the valve. This leads to an increase of pressure in the pumping chamber which may prolong fuel flow through the nozzle or it may result in a so-called secondary injection of fuel.

In tests it is found that pressure pulses occur in the outlet chamber and sometimes the pressure pulses occur at a time to attenuate the bounce of the valve member but at other times the pressure pulses occur too late and the bounce takes place leading to the difficulties outlined above.

The object of the present invention is to provide a spill control valve in a simple and convenient form.

According to the invention an electromagnetically operable spill control valve for the purpose specified comprises in combination, a valve member slidable in a bore, a seating defined in the bore, the valve member being shaped for co-operation with the seating, the valve member and the bore defining an inlet chamber and an outlet chamber on opposite sides of the seating, the inlet chamber in use being connected to a pumping chamber of the injection pump and the outlet chamber to a drain, means coupling the valve member to an armature of an electromagnetic actuator which when energised draws the valve member into engagement with the seating to prevent in use flow of fuel between the inlet chamber and the outlet chamber, resilient means acting to oppose the movement of the valve member by the actuator, stop means for determining the extent of movement of the valve member away from the seating under the action of the resilient means when the actuator is de-energised, and damping means acting to control said movement of the valve member whereby bounce of the valve member is minimised.

An example of a spill control valve in accordance with the invention will now be described with reference to the accompanying drawings in which.

Figure 1:
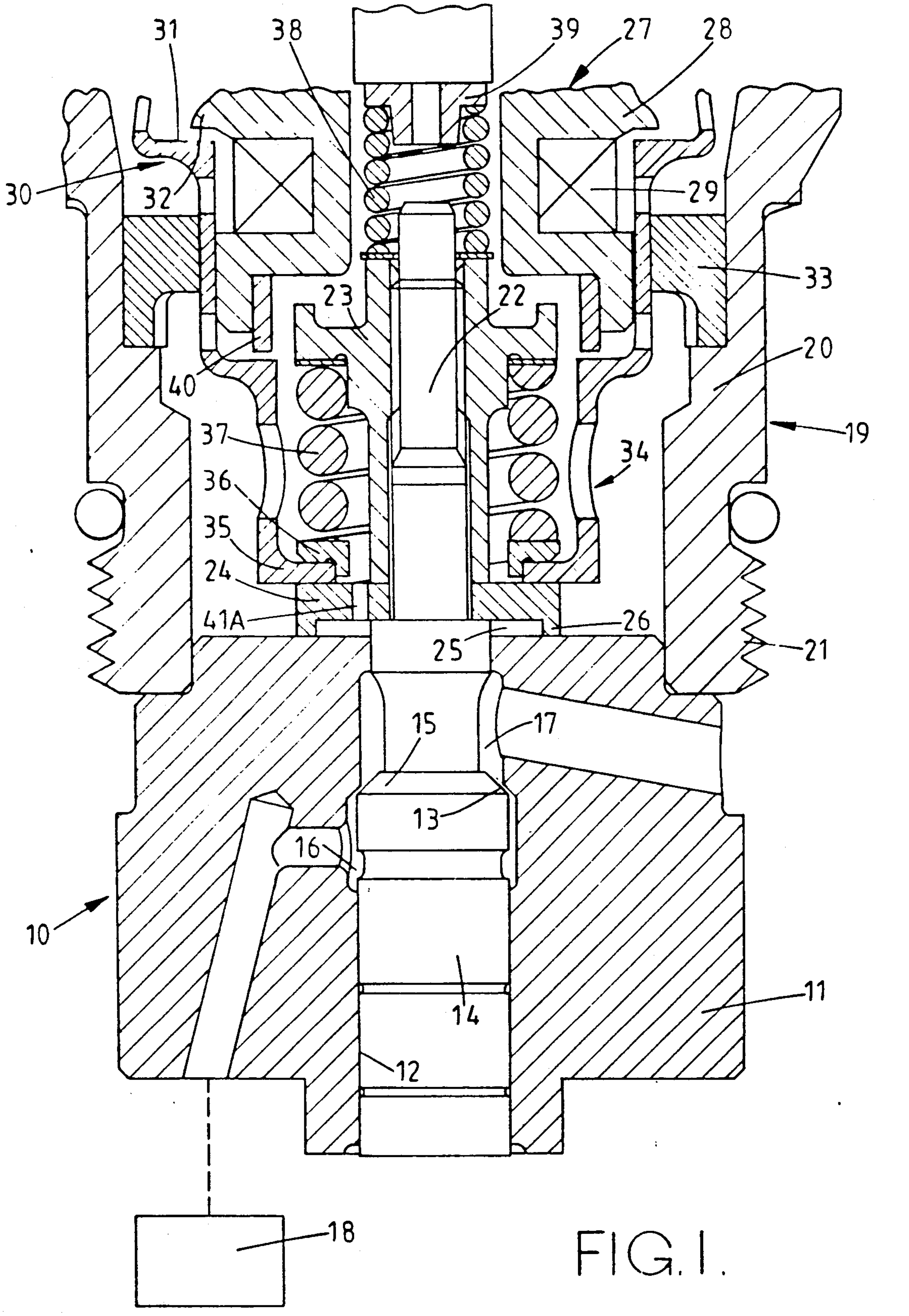
FIG. 1 is a sectional side elevation showing part of the control valve.

Referring to FIG. 1 of the drawings the spill control valve generally indicated at 10 includes a valve body 11 in which is defined an axial bore 12. Defined in the bore is a seating 13 and slidable within the bore is a valve member 14. The valve member is shaped as at 15, for engagement with the seating and the bore and valve member define an inlet chamber 16 and an outlet chamber 17 on opposite sides of the seating. Conveniently the outlet chamber 17 is for the most part defined by a groove in the valve member whilst the inlet chamber 16 is mainly defined by a groove formed in the wall of the bore 12. The inlet chamber 16 is connected to the pumping chamber of a high pressure fuel injection pump indicated diagrammatically at 18 and the pumping chamber of this pump is also connected to a fuel injection nozzle (not shown). The outlet chamber 17 communicates with a drain.

The control valve also includes an electromagnetic actuator which is generally indicated at 19 and this comprises an annular casing 20 which engages over part of the valve body 11. The end portion of the casing 20 is provided with a screw threaded portion 21 which in practice will be secured within the body of the injection pump thereby trapping the valve body 11 to maintain the valve body and the casing body in assembled relationship.

The valve member 14 is provided with an extension 22 which extends within the actuator body and engaged with the extension is a flanged spring abutment 23. The abutment 23 serves to secure against a step on the valve member, a circular plate 24 which is provided with an opening through which the extension 22 of the valve member extends. The plate 24 in its face directed towards the valve body 11 is provided with a recess 25, the formation of the recess resulting in an annular rim 26 which engages with the valve body 11 and forms a stop to limit the movement of the valve member away from the seating 13.

The actuator includes a core member 27 which defines a plurality of ribs one of which is seen at 28. The ribs increase in diameter as the distance from the valve body increases and adjacent ribs define circumferential grooves which accommodate windings one of which is seen at 29. The actuator also includes an armature 30 which is of hollow cylindrical form having a stepped peripheral surface so as to define pole faces 31 which are presented to pole faces 32 defined by the ribs 28. The armature is guided by an annular guide member 33 and a further reduced cylindrical portion 34 at its end adjacent the valve body, is provided with an inwardly extending flange 35. The flange 35 is located between the plate 24 and a spring abutment 36 between which and a flange on the spring abutment 23, there is located a coiled compression spring 37. The spring 37 is preloaded, the extent of preload being adjustable by means of shims.

The valve member is biased to the open position in which it is shown, by means of a coiled compression spring 38 one end of which engages the spring abutment 23 and the other end of which engages an abutment 39 the setting of which is adjustable.

As stated above, the valve member is shown in the open position. The extent of lift is very small and in the drawing has been slightly exaggerated. With the valve in the open position, during inward movement of the pumping plunger of the injection pump fuel is displaced from the pumping chamber of the injection pump and flows to the inlet chamber 16 and then to the outlet chamber 17 and then to a drain. When the windings 29 of the actuator are energised the ribs 28 are magnetically polarised and the pole faces 31 and 32 are attracted to each other so that a force is exerted on the armature and this force through the spring 37, imparts movement to the spring abutment 23 and hence the valve member 14 against the action of the spring 38. The valve therefore moves into sealing engagement with the seating 13 and the flow of fuel between the inlet and outlet chambers is prevented so that further fuel displaced from the pumping chamber flows to an injection nozzle.

The movement of the valve member is halted by its engagement with the seating but the armature is allowed continued movement or "overtravel" movement by virtue of the fact that the spring 37 is compressed by a small amount. The maximum movement of the armature is determined by a stop ring 40 which is mounted on the core member. In the closed position of the valve member therefore the armature will engage the stop ring 40, there will be a small gap between the pole faces 31 and 32 and the flange 35 of the armature will be spaced slightly from the plate 24.

When the windings are de-energised the springs 37 and 38 act to cause movement of the spring abutment 23 and the valve member towards the open position. The final movement of the valve member is arrested by the engagement of the rim 26 defined on the plate 24 with the valve body. Bounce will tend to occur. However, this bounce is minimised by the provision of the recess 25 and a port 41 which is formed in the plate 24 and which connects the recess with the interior of the actuator. The free space within the actuator will in practice be filled with fuel and a dash pot action is created as the plate moves towards the end surface of the valve body. Some of the fuel in front of the plate will tend to flow radially through the diminishing gap between the rim 26 and the end face of the valve body and thereby provide a damping action. Some fuel will also flow through the aperture 41A but the main purpose of the aperture 41A is to minimise the effect of the dash pot during closing of the valve member. During the closing of the valve member the armature moves the valve member and the associated parts relatively slowly during the initial movement and the presence of the aperture 41A permits fuel to flow into the recess 25 so that there is substantially no hindrance to the movement of the valve member.

Figure 2:
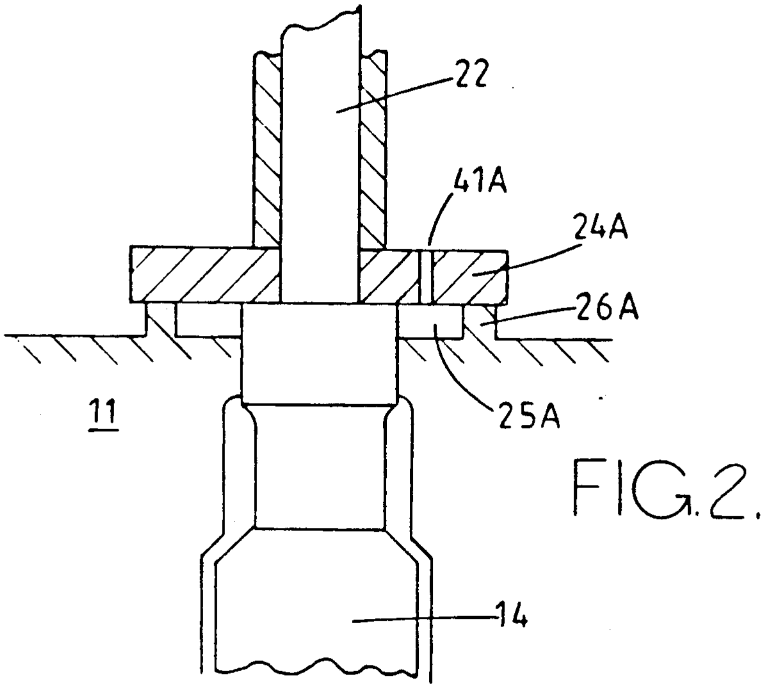
FIG. 2 is a view showing part of the valve seen in FIG. 1 but also illustrating a modification.

FIG. 2 shows an alternative arrangement in which the recess 25A is formed in the valve body 11, the recess being bounded by a rim 26A. In this case the plate 24A is flat but it does define the aperture 41A. In an alternative arrangement the aperture 41A is replaced by one or more radial slots formed in the rims 26 or 26A.

Figure 3:
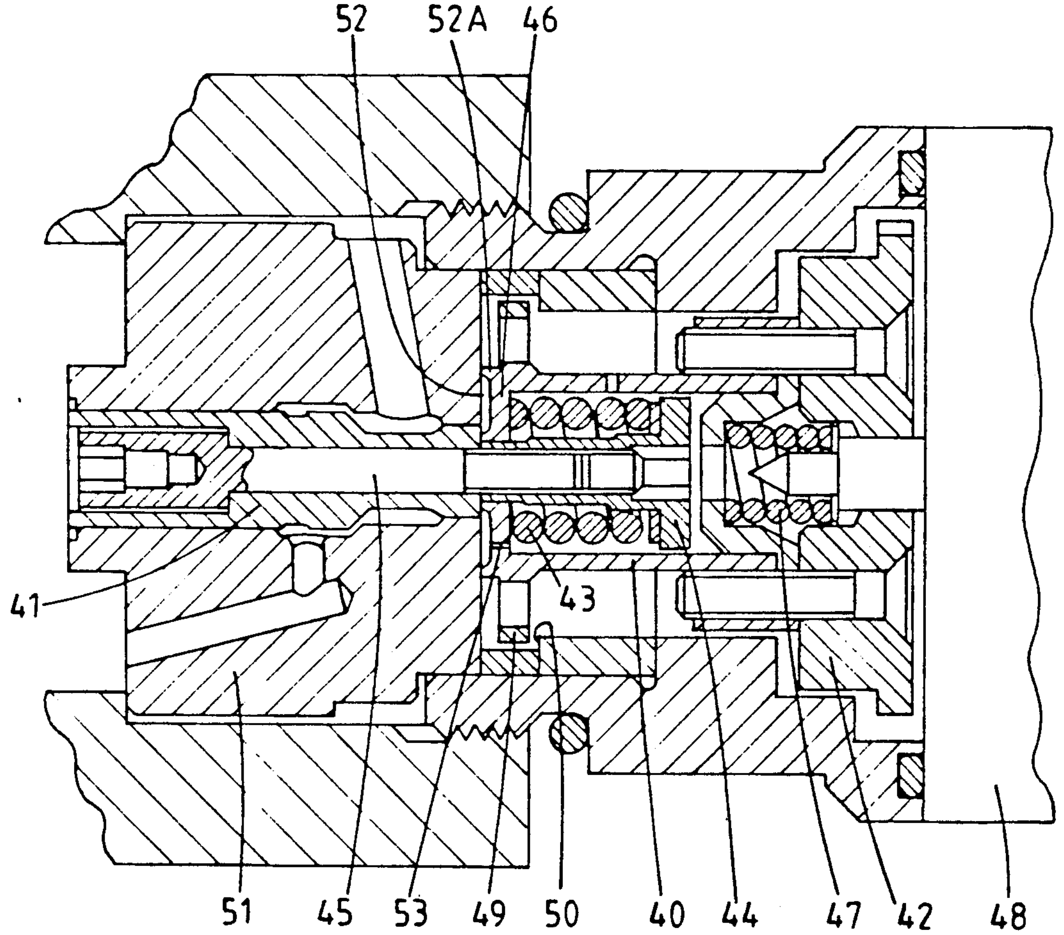
FIG. 3 is a view similar to FIG. 1 showing another form of control valve.

In the contructions shown in FIGS. 1 and 2, the plate 24 is secured to the valve member 14. In an alternative construction as seen in FIG. 3, a coupling member 40 is directly connected to an armature 42 and indirectly connected by way of a coiled compression spring 43, with a spring abutment 44 secured to the valve member by means of a central bolt 45 passing through the valve member. The coupling member has a base wall 46 through an aperture in which passes a reduced portion of the spring abutment.

The armature 42 is of generally rectangular configuration and is moved against the action of a spring 47 when a solenoid contained in a housing 48 is energised. The initial movement of the armature closes the valve member 41 onto its seating and movement of the armature continues until a flange 49 on the coupling member engages with a step 50. During the additional movement after closure of the valve the spring 43 is compressed and a small gap exists between the armature and the pole faces of the solenoid. When the solenoid is de-energised the energy stored in both springs moves the valve member to the open position. The movement of the armature is halted by the engagement of the outer surface of the base wall of the coupling member 40 with the end surface of the valve body 51. Bounce tends to take place and this can have the effect of partly reclosing the valve leading to the effects previously mentioned.

In order to provide the damping effect the outer surface of the base wall 46 is provided with an annular recess 52 which functions in the same manner as the recess 25 of the example of FIG. 1. The formation of the recess results in an annular rim 52A. An opening 53 is provided from the recess into the interior of the coupling member and the wall of the latter is provided with apertures. Instead of forming the recess in the base wall of the coupling member it may be formed in the manner shown in FIG. 2, in the end surface of the valve body 51.

Figure 4:
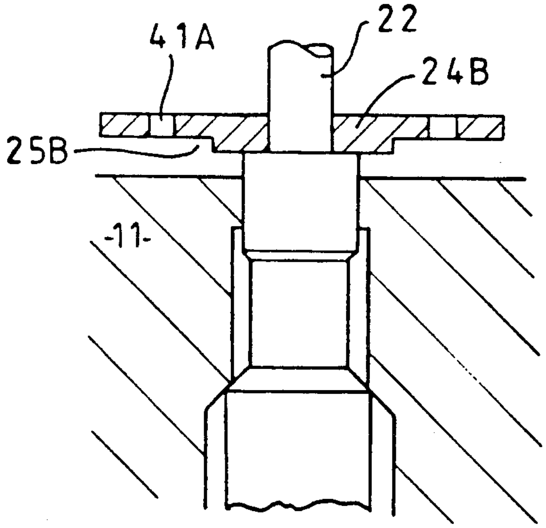
FIG. 4 shows a modification to the valve shown in FIG. 1.

FIG. 4 shows a modification to the arrangement shown in FIG. 1 in which the plate 24B has its face presented to the body 11 relieved to provide an open recess 25B. The plate is provided with a plurality of apertures 41A. As the valve member moves to the open position, fuel is driven from the recess 25B to provide the damping action.

In the examples described the apertures 41A and 53 are preferably sharp edged orifices so that changes in the viscosity of the fuel have little influence on the flow through the apertures.

GB 2135757 shows a valve in which the equivalent of the plate 24A and the valve body 11 have flat presented surfaces which move into engagement with each other as the valve member moves to its fully open position. A damping effect is provided as fuel has to escape from between the surfaces. However, the fuel has to flow along a narrow flow path which becomes narrower as the valve member moves to its open position. As a result the damping effect is dependent upon the viscosity of the fuel. Moreover, the surfaces tend a stick together so that closure of the valve member is hindered.

With the arrangement as described only a small area of contact exists in the open position of the valve member so that the risk of sticking is minimised.

I claim:

1. An electromagnetically operable spill control valve comprising
   - a valve member slidable in a bore in a valve body,
   - a seating in the bore,
   - the valve member being shaped for cooperation with the seating, inlet and outlet chambers defined on opposite sides of the seating.

an armature coupled to the valve member, the armature forming part of an electromagnetic actuator, which when energized draws the valve member into engagement with the seating to prevent fluid flow between the inlet and outlet chambers.

resilient means acting directly upon said valve member to oppose the movement of the armature, stop means for determining the extent of movement of the armature, stop means for determining the extent of movement of the valve member away from the seating under the action of the resilient means when the actuator is de-energized.

damping means acting to control said movement and minimize bounce of the valve member, said damping means including an annular recess defined on said valve body, said recess having an outer surface defining an annular rim, and a part being connected to the valve member and moving towards the valve body when the actuator is de-energized, said part defining a restricted opening communicating with said recess.

2. A control valve according to claim 1, in which said openings are sharp-edged orifices.

3. An electromagnetically operable spill control valve comprising a valve body, an end wall on said valve body, a bore formed in said body and extending to one end of said body, a seating defined in said bore, a valve member slidable in said bore and shaped for cooperation with said seating, inlet and outlet chambers defined by said valve member and said bore on opposite sides of said seating, said outlet chamber being positioned intermediate said seating and said end wall, an armature coupled to said valve member, a solenoid, a winding in said solenoid which can be energized to effect movement of said armature and to draw said valve member into engagement with said seating to prevent fluid flow from said inlet chamber to said outlet chamber, resilient means acting to oppose the movement of said valve member toward said seating, an annular element engageable with said end wall of said body, coupling means attaching said annular element to said valve member, an annular rim on said end wall, said rim defining a recess, said annular element being engageable with said rim to limit the movement of the valve member away from said seating, said annular element having a restricted opening in communication with said recess, an interface between said valve member and said valve body, disposed at said end wall of said valve body, said interface defined such that fluid leaks from said outlet chamber to said recess, the fluid displaced from said recess during movement of said annular element towards said end wall of said valve member acting to damp the movement of said valve member under the action of said resilient means.

* * * * *